(12) United States Patent
Del Vecchio et al.

(10) Patent No.: US 6,798,630 B1
(45) Date of Patent: Sep. 28, 2004

(54) TRIP DEVICE COMPRISING AN IMPROVED MAN-MACHINE INTERFACE AND CIRCUIT BREAKER COMPRISING SUCH A TRIP DEVICE

(75) Inventors: Alain Del Vecchio, Eybens (FR); François Vincent, La Buissee (FR); Luc Weynachter, Grenoble (FR)

(73) Assignee: Square D Company, Palatine, IL (US)

(*) Notice: Subject to any disclaimer, the term of this patent is extended or adjusted under 35 U.S.C. 154(b) by 322 days.

(21) Appl. No.: 09/632,266

(22) Filed: Aug. 3, 2000

(30) Foreign Application Priority Data

Sep. 13, 1999 (FR) .............................. 99 11549

(51) Int. Cl.$^7$ ................................................ H02H 3/00
(52) U.S. Cl. ......................................... 361/97; 345/810
(58) Field of Search ........................... 361/62, 78, 93.4, 361/94, 97, 115, 96, 187; 700/83, 292, 293; 345/440.1, 619, 700, 705, 716, 763, 880, 840, 771; 340/525, 638, 644, 664

(56) References Cited

U.S. PATENT DOCUMENTS

| | | | |
|---|---|---|---|
| 4,245,318 A | * | 1/1981 | Eckart et al. .................. 361/63 |
| 4,752,853 A | * | 6/1988 | Matsko et al. ................. 361/94 |
| 4,926,343 A | * | 5/1990 | Tsuruta et al. ................. 706/45 |
| 5,101,316 A | | 3/1992 | Levain .......................... 361/93 |
| 5,220,470 A | | 6/1993 | Ananth et al. ................. 361/97 |
| 5,367,427 A | | 11/1994 | Matsko et al. ................. 361/94 |
| 5,596,473 A | * | 1/1997 | Johnson et al. ............. 361/115 |
| 5,675,754 A | * | 10/1997 | King et al. .................. 345/823 |
| 5,872,722 A | * | 2/1999 | Oravetz et al. ............. 700/292 |
| 6,038,516 A | * | 3/2000 | Alexander et al. ............. 702/67 |

* cited by examiner

*Primary Examiner*—Michael Sherry
*Assistant Examiner*—Gary L. Laxton
(74) *Attorney, Agent, or Firm*—Parkhurst & Wendel, L.L.P.

(57) ABSTRACT

The electronic trip device includes a processing unit having inputs to receive electrical signals representative of electrical quantities and an output to supply a tripping signal to a tripping relay, and a man-machine interface connected to the processing unit to supply setting parameters and to display information and tripping curves on a screen. The man-machine interface includes display means displaying setting parameters which modify the visual aspect of at least one portion of curve representative of a parameter whose setting is being adjusted. The circuit breaker includes such a trip device connected to current sensors and to contacts to interrupt currents in electrical conductors.

14 Claims, 6 Drawing Sheets

TRIP DEVICE COMPRISING AN IMPROVED MAN-MACHINE INTERFACE AND CIRCUIT BREAKER COMPRISING SUCH A TRIP DEVICE

BACKGROUND OF THE INVENTION

The invention relates to an electronic trip device comprising:

a processing unit having inputs to receive electrical signals representative of electrical quantities and an output to supply a tripping signal to a tripping relay, and a man-machine interface connected to the processing unit to supply setting parameters and to display information and tripping curves on a screen.

The invention also relates to a circuit breaker comprising such a trip device.

Electronic trip devices of known types comprise man-machine interfaces to perform adjustment of the tripping parameter settings. The man-machine interfaces generally comprise screens for display of said setting parameters and display of values of electrical quantities, in particular the values of the currents flowing in the contacts of a circuit breaker. It is also known to use a keypad or buttons to select pre-established setting parameters, for example tripping function threshold or time delay parameters.

A trip device comprising a man-machine interface with a flat screen readout is described in particular in the Patents FR 2,654,539 and U.S. Pat. No. 5,220,479. In these documents the screen graphically displays the shape of the tripping curve, setting parameter indications, and current values.

Other circuit breakers comprising user interfaces with readout displays and keypad buttons are described in the U.S. Pat. Nos. 4,870,531 and 4,991,042.

However, known man-machine interfaces or user interfaces do not enable dependable setting parameter adjustment to be performed. Known interfaces generally use scrollable menus which do not give sufficient indication of the setting operations being performed.

SUMMARY OF THE INVENTION

The object of the invention is to provide a trip device comprising an improved man-machine interface enabling parameter settings to be adjusted or information to be displayed easily and dependably, and to provide a circuit breaker comprising such a trip device.

In a trip device according to the invention, the man-machine interface comprises means for displaying setting parameters which modify the visual aspect of at least one portion of curve representative of a parameter whose setting is being adjusted.

In a preferred embodiment, the means for displaying setting parameters modify the visual aspect of at least one portion of curve by increasing the thickness of said at least one portion of curve representative of a parameter whose setting is being adjusted.

Preferably, the means for displaying setting parameters frame at least one item of information displayed on the screen representative of a parameter whose setting is being adjusted.

Advantageously, the means for displaying setting parameters change at least a color of text or background of at least one item of information displayed on the screen representative of a parameter whose value is being modified.

In a particular embodiment, the man-machine interface comprises display means for displaying a scrollable menu to frame at least one item of information to be selected in a selection phase.

Preferably, the display means frame in a scrollable menu one item of information in the top-most position, one item of information in the bottom-most position, and items of information scrolled in a frame in a fixed intermediate position between a top-most position and a bottom-most position.

In a preferred embodiment, the man-machine interface comprises selection means comprising function buttons associated to indicator lights to indicate a function selected by a button.

Advantageously, the function buttons comprise at least a first button to select a measurement function, at least a second button to select a maintenance function, and a third button to select a setting function.

Preferably, the parameters of a trip device according to an embodiment of the invention are set according to a process comprising:

a step involving pressing on a setting function selection button, a step involving display of a list of protection curves, a step involving pressing on at least one shift button in a scrollable menu, a step involving pressing on a validate button to select a curve whose parameters are to be set, a step involving display of a selected curve and of corresponding setting parameters, a step involving display of a selected portion of curve with broader thickness and of a corresponding parameter with a frame, a step involving pressing on at least one shift button to change the portion of curve and the corresponding parameter, a step involving pressing on a validate button to switch to parameter value modification mode, a step involving pressing on a shift button to change parameter values, and a step involving pressing on at least one validate button to quit modification mode.

A circuit breaker according to the invention, comprising main contacts connected in series with power conductors, current sensors arranged on said conductors, and a tripping relay receiving a tripping signal to bring about opening of said contacts, comprises a trip device as defined above connected to said current sensors and to said tripping relay.

BRIEF DESCRIPTION OF THE DRAWINGS

Other advantages and features will become more clearly apparent from the following description of particular embodiments of the invention, given as non-restrictive examples only and represented in the accompanying drawings in which.

DETAILED DESCRIPTION OF PREFERRED EMBODIMENTS

Figure 1:
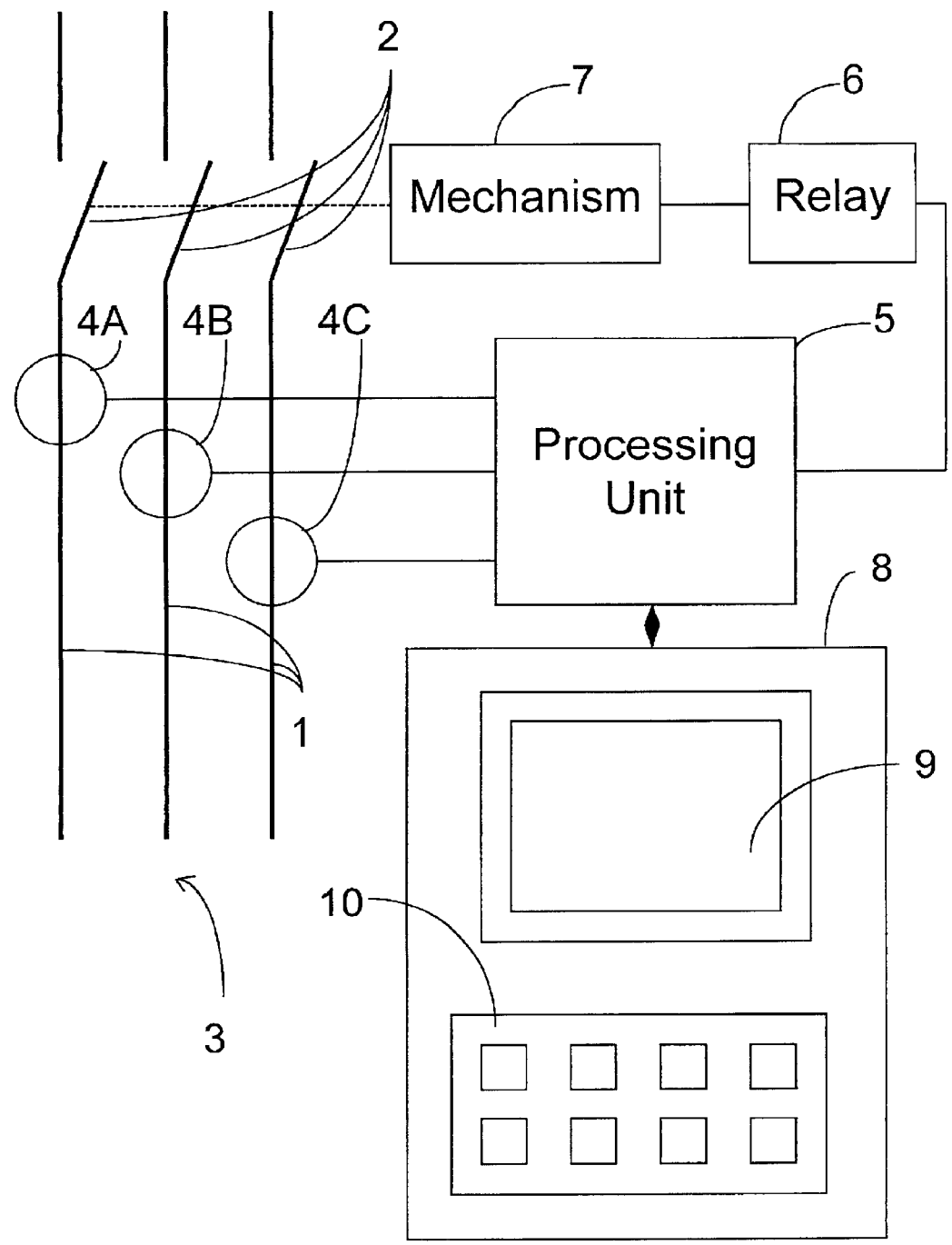
FIG. 1 represents the diagram of a circuit breaker comprising a trip device of the prior art.

The diagram of FIG. 1 represents a circuit breaker comprising a trip device of the prior art. In this circuit breaker, main conductors 1 are connected in series with contacts 2 designed to interrupt an electrical current in an electrical power distribution system 3.

Current sensors 4A, 4B, 4C supply signals of the current flowing in the main conductors to a processing unit 5. The processing unit 5 performs in particular the protection functions and supplies a tripping a relay 6 if current signals exceed preset protection curves. For example, the tripping curves are representative of long-delay, short-delay, instantaneous and/or ground fault protection functions. The tripping relay 6 operates a contact opening mechanism 7 when it is commanded by the processing unit 5.

The tripping curve settings are preferably made by means of a man-machine interface 8 connected to the processing unit. The interface 8 generally comprises a screen 9 and a keypad or buttons 10. The man-machine interface thus enables setting parameters to be supplied and information and tripping curves to be displayed on the screen.

Adjusting the trip device settings is an operation which requires great care as it contributes to the safety of an electrical installation. A man-machine interface of a trip device according to the invention participates in the safety of an installation by preventing risks of errors and making adjustments easier to make.

In one embodiment of the invention, the man-machine interface comprises means for displaying setting parameters which modify the visual impact of at least one portion of curve representative of a parameter whose setting is being adjusted.

Figure 2:
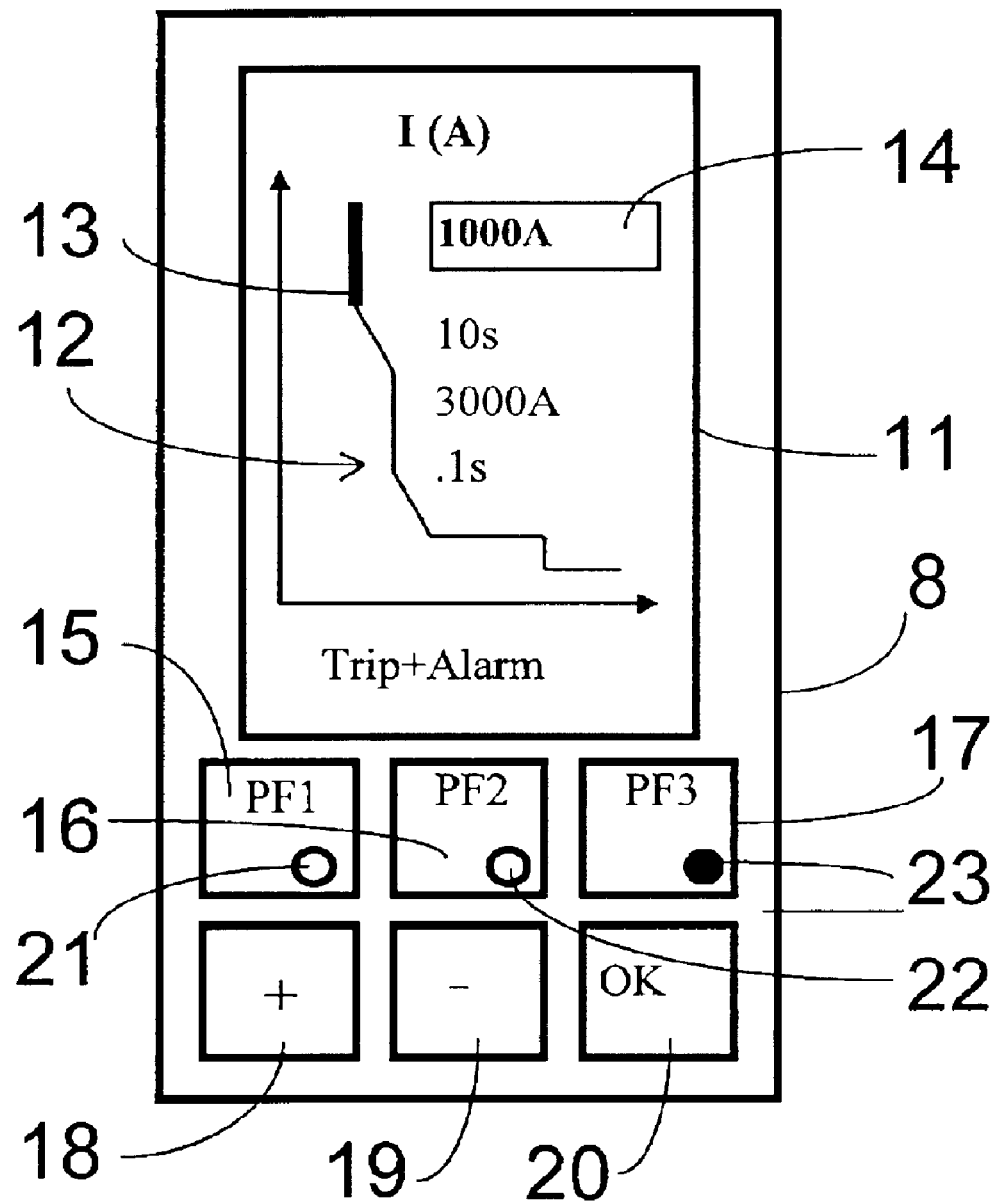
FIG. 2 represents a man-machine interface of a trip device according to an embodiment of the invention.
Figure 7:
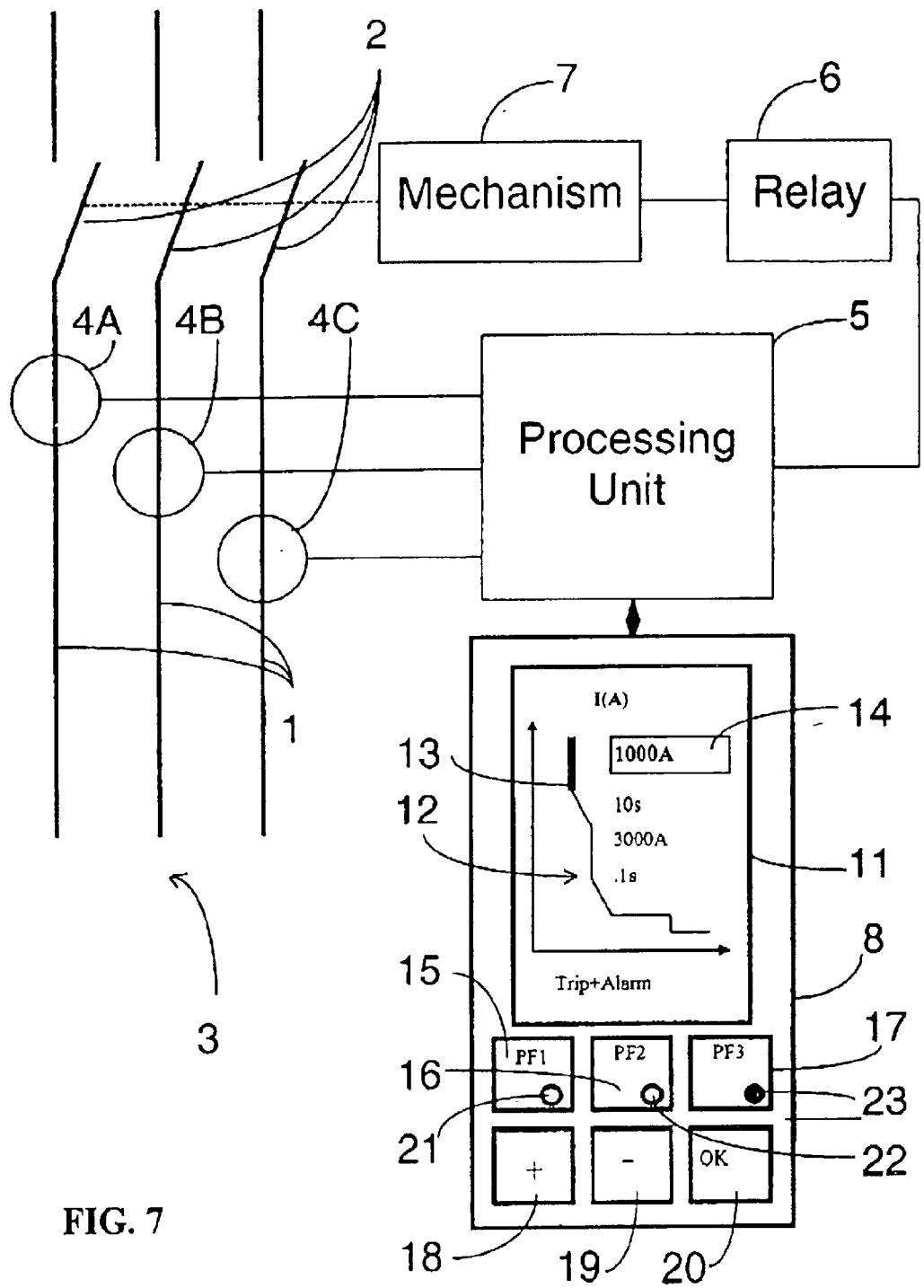
FIG. 7 represents a diagram of the circuit breaker comprising the trip device shown in FIG. 2.

In the man-machine interface represented in FIG. 2, a graphic or semi-graphic display screen 11 displays a tripping curve 12. In this FIG., a portion of curve 13 representative of a long-delay or overload protection current threshold has a different visual aspect. In this case, this portion of curve is thicker than the rest of the curve, and a parameter 14 corresponding to this broader portion of curve is framed. In the case of FIG. 2, the long-delay tripping threshold is 1000A. The framed parameter can also be displayed in bold characters to highlight display of the selection. FIG. 7 represents a diagram of the circuit breaker compromising the trip device shown in FIG. 2. Corresponding reference numbers refer to common elements in FIGS. 2 and 7.

The man-machine interface comprises function select buttons and shift and display buttons. The function select buttons comprise a first button 15 to select a measurement function, a second button 16 for selecting maintenance, and a third button 17 for selecting the setting adjustment function. The shift and validate buttons comprise a button 18 for incrementing a value or for shifting a scrollable menu in a first direction, a button 19 for decrementing a value or for shifting a scrollable menu in a second direction, and a validate button 20.

To be able to know which function select button has been activated, each function button 15, 16, 17 is associated to a light indicator respectively 21, 22, 23. For example, in FIG. 2 the button 17 is selected and the associated indicator 23 is lit to display that the parameter setting adjustment function is selected.

Figure 3A:
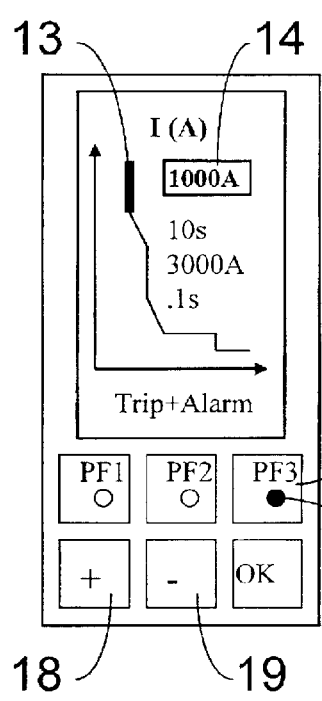
FIGS. 3A to 3C represent selections of parameters to be adjusted.
Figure 3B:
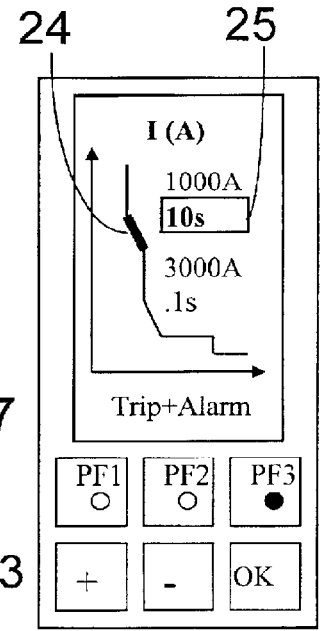
Figure 3C:
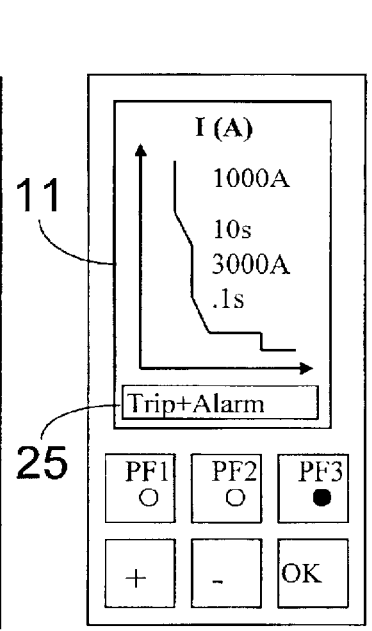

FIGS. 3A to 3C show a parameter selection cycle. In FIG. 3A, the button 17 is selected and the indicator 23 is lit. The button 17 selects the setting function. The portion 13 of the curve is thicker and the corresponding parameter 14 is framed. Then pressing the button 18 or 19 changes the parameter to be selected. For example, a portion 24 of the curve and a corresponding parameter 25 can be selected as in the representation of FIG. 3B. In this case, the selected parameter is the value of the long-delay function time delay. Other presses on the buttons 18 and 19 can make the selection move on to other functions concerning the curve. For example, in FIG. 3C, the selection involves an action parameter 26 concerning overshooting the curve. The parameter may involve tripping only, or it may involve tripping with an alarm signal or command of an output relay.

Figure 4A:
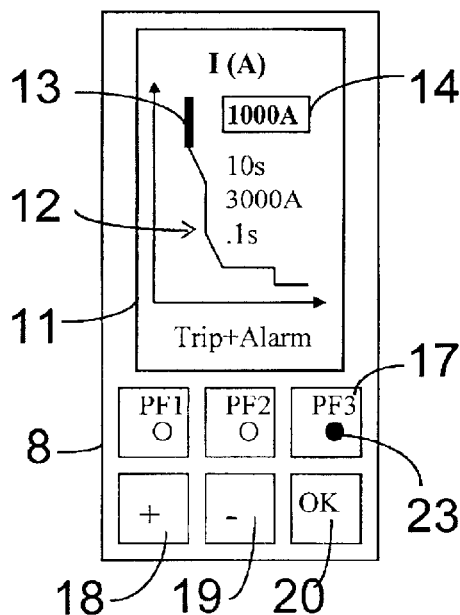
FIGS. 4A and 4B represent a setting adjustment phase.
Figure 4B:
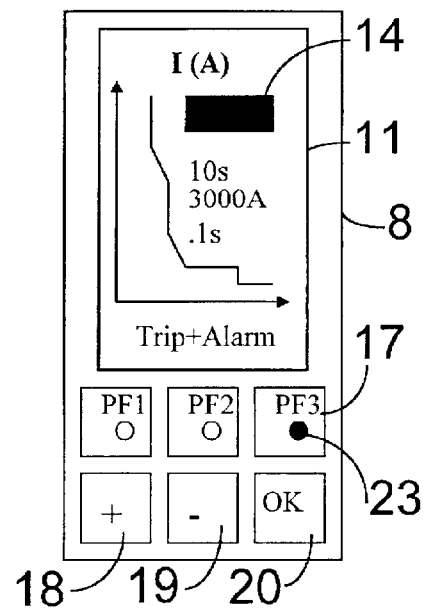
Figure 5A:
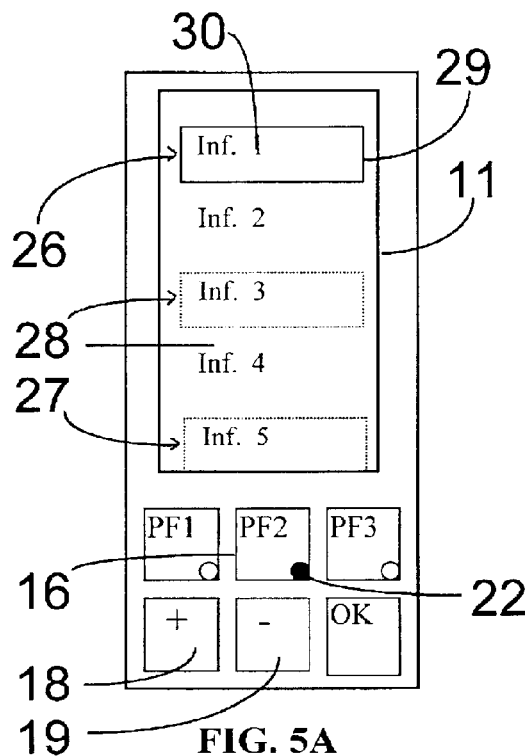
FIGS. 5A to 5D represent scrolling of a menu in an information selection phase.
Figure 5B:
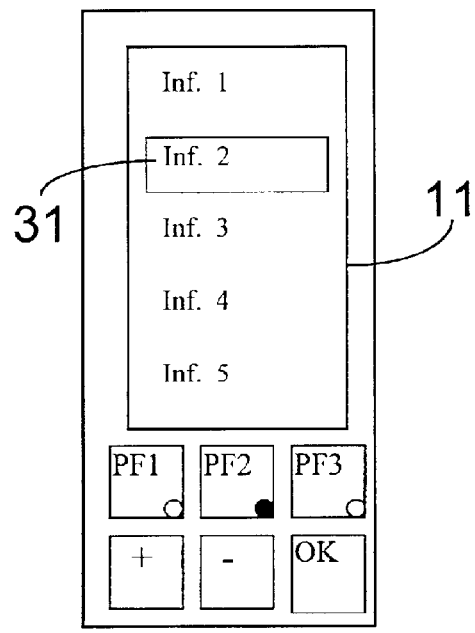
Figure 5C:
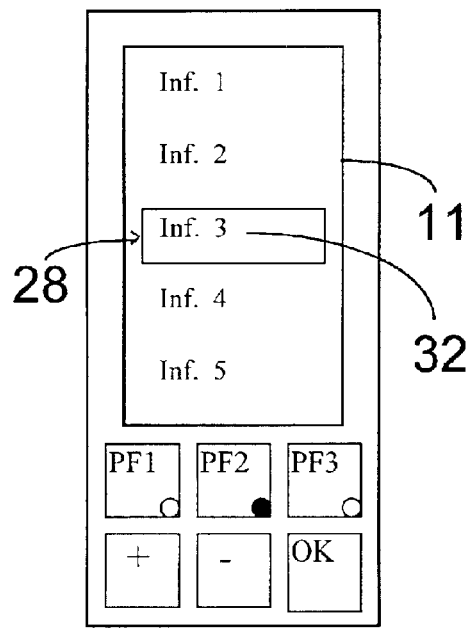
Figure 5D:
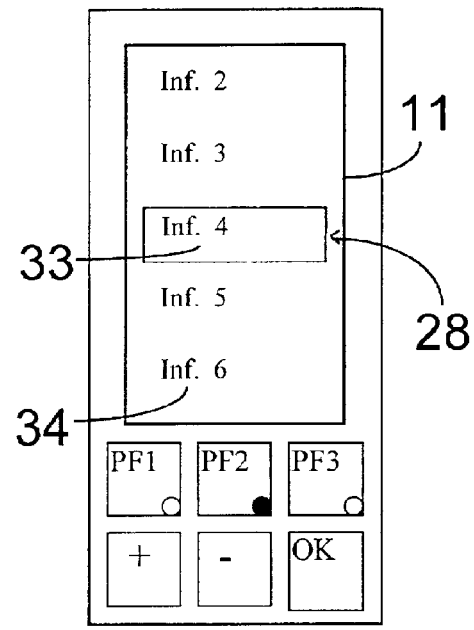

FIGS. 4A and 4B show a setting adjustment phase. When a parameter is selected by means of the button 17, and possibly with the buttons 18 and 19, pressing the validate button 20 switches the parameter to setting or modification mode. The selected and framed parameter then switches to a different display mode, preferably reverse video as shown by the representation of FIG. 4B. Thus FIG. 4A shows the interface before the validate button 20 is pressed and FIG. 4B shows the interface after said button 20 has been pressed. The different display mode may also be a color change of the text and/or background.

Then, when the interface is in the possible modification state as represented in FIG. 4B, pressing the buttons 18 or 19 modifies the values of the selected parameter. In this case, a change of the long-delay protection threshold value can be made. At the end of the setting modification operation, another press on the validate button 20 switches back to select mode and enables other parameters to be selected or the setting function to be quit FIGS. 5A to 5D represent the steps of a menu in an information selection phase. Information selection can be performed whatever the required function. For example, in FIGS. 5A to 5D, information selection is performed with the second maintenance function button 16 selected. The indicator light 22 is then active.

The buttons 18 and 19 in this case make it possible to frame an item of information to be selected. Selection is therefore made by moving a frame 29 to select an item of information or by moving the information menu according to the position of said frame.

The frame can be in a top-most position 26, in a bottom-most position 27 or in intermediate positions. An intermediate position 28 between the top-most position and the bottom-most position is determined to scroll the information menu if the number of items of information is greater than the number of screen lines for display of said information. In the case of FIGS. 5A to 5D, the number of positions is five, the top-most position 26 is on the first line, the bottom-most position 27 is on the fifth line, and the intermediate position 28 is on the third line.

In a descending scrolling sequence the frame 29 moves from the first item of information 30 to the second item of information 31 then to the item of information 32. If the frame is in an intermediate position 28, it is then the items of information which are scrolled upwards. An item of information 33 thus moves up into the frame in the intermediate position 28, an item of information 34 of rank six is displayed on the screen and the first item of information 31 is removed. When the last item of information is displayed, the frame can then move to the bottom-most position.

In an ascending scrolling sequence the frame is shifted in a similar way. The frame remains in the intermediate position so long as items of information are not on the screen and moves up to the top-most position as soon as the first item of information 31 is in the top-most position 26.

Figure 6:
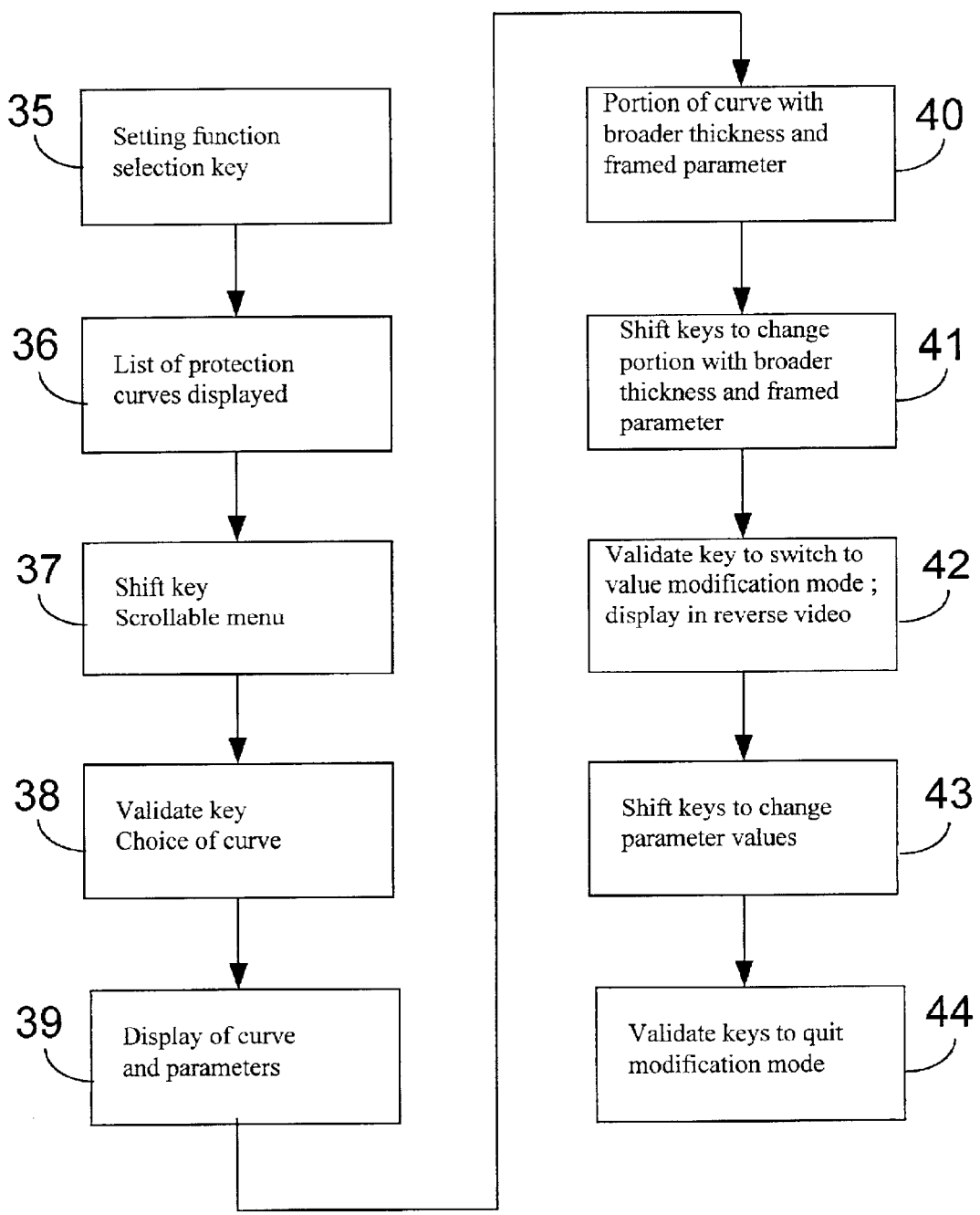
FIG. 6 represents a flowchart of a setting phase.

FIG. 6 represents a flowchart showing switching from a scrollable menu to a parameter setting and modification phase.

In this flowchart, the selection button 17 is pressed in a step 35. Then, in a step 36, a list of parameter setting functions is displayed on the screen 11. This list contains in particular the protection curves, for example the long-delay, short-delay or ground fault protections. To select the function, in a step 37, a scrollable menu is actuated by means of the buttons 18 and 19, such as for example in FIGS. 5A to 5D. When the function is framed, in a step 38, the validate button 20 is actuated, in a step 39, to display the curve or function selected and the corresponding parameters.

In a step 40 a portion of curve is displayed with a broader thickness and the corresponding parameter is framed. The shift buttons 18 and 19 then enable the portion of curve and the framed parameter to be changed in a step 41. Then, when the selection has been made, pressing the validate button 20 in a step 42 switches the interface to value modification mode. Display of the parameter is then in reverse video. Then, in a step 43, the shift buttons 18 and 19 enable the value of the parameter to be changed, for example, by displaying preset values of the selected parameter for setting adjustment purposes. Finally, in a step 44, pressing the validate button 20 records the new value of the parameter and quits the value modification mode.

The man-machine interface can advantageously be associated to manual setting means or to remote setting means connected by communication means. When manual setting means are activated, the interface automatically switches to parameter setting adjustment mode and the value determined by the manual setting means is displayed. The manual setting means can advantageously be selector switches or thumb-wheels which do not absolutely require the presence of a readout or of a man-machine interface.

When the man-machine interface is associated to the manual setting means, the parameter values which can be changed by the interface are limited to the maximum values of said parameters determined by the manual setting means. For example, if the manual setting means attribute a long-delay protection threshold and a long-delay protection time delay, the interface will enable adjustment of the parameters involved between minimum values and the values of long-delay thresholds and time delays determined by the manual setting means.

Access to the manual setting means can preferably be disabled, for example, by a cover which prevents any operations after settings have been made by authorized persons and the man-machine interface can be left accessible to other personnel.

The measurement functions accessible via the button 15 can for example be:
- phase and neutral current measurements,
- ground or earth fault current measurements,
- voltage measurements between phase and neutral or between two phases,
- apparent, active, or reactive power measurements,
- energy measurements,
- frequency measurements, and/or
- power factor or peak factor measurements.

When tripping takes place, the current interrupted can thus be displayed.

Averages of electrical quantities described above can also be displayed, these averages being calculated over variable time periods.

The maintenance functions accessible via the button 16 can for example be:
- tripping accounts indicating the type of fault, the date and time, and the values measured at the time of the fault, for example the current interrupted,
- alarm accounts indicating for example the type of alarm, the date, the time and the values measured when the alarm was activated,
- display of information representative of contact wear, of an operations or temperature meter,
- relay control functions,
- configuration functions of communication parameters on a network, and/or
- test parameter configuration functions.

The relay parameter configuration functions enable an input quantity, a threshold, a direction in which the threshold is exceeded, either increasing or decreasing, and the presence or not of a hysteresis cycle to be selected. The input quantity can for example be a current, a voltage, a power, a temperature value or a frequency.

The protection functions accessible via the button 17 can for example be:
- long-delay, short-delay, and instantaneous protection curves,
- earth fault protection curves,
- differential protection curves,
- voltage unbalance, over-voltage or under-voltage alarms,
- over-power or power feedback alarms,
- under-frequency or over-frequency alarms,
- indications on the phase rotation direction, and/or
- load-shedding and reconnection functions according to the current or power values.

When the man-machine interface is associated to remote setting means connected by communication means, the communication protocol can advantageously be of Internet type, notably in the format called "TCP/IP" or in the format called hypertext "HTTP".

The man-machine interface can, for example, be represented by a computer screen to display information and tripping curves and to determine setting parameters. Setting parameters are advantageously determined by soft keys represented on the screen of the man-machine interface. Movement of a cursor onto a soft key enables said key materialized by an image on the screen to be selected and then actuated.

What is claimed is:

1. A man-machine interface for an electronic trip device comprising:
an interface for supplying setting parameters, each having a respective value, and for displaying information and tripping curves on a screen, said setting parameters for modifying during a setting operation a visual aspect of the line of at least one portion of a curve representative of a parameter whose setting is being adjusted; and
a processing unit connected to the interface, said processing unit having inputs for receiving electrical signals representative of electrical quantities and an output for supplying a tripping signal to a tripping relay, wherein said interface comprises means for displaying setting parameters comprising:

means for activating a setting function selection button;

means for displaying a list of protection curves;

means for activating at least one shift button in a scrollable menu;

means for activating a validate button to select a curve whose parameters are to be set;

means for displaying a selected curve and corresponding setting parameters;

means for displaying a portion of the selected curve and a corresponding parameter with a frame;

means for activating at least one shift button to change the portion of a curve and a corresponding parameter;

means for activating a validate button to switch to a parameter value modification mode;

means for activating a shift button to change parameter values; and means for activating at least one validate button to quit a modification mode.

2. The man-machine interface according to claim 1, wherein the means for displaying setting parameters is for modifying the visual aspect of at least one portion of a curve by increasing the thickness of said at least one portion of such a curve representative of a parameter whose setting is being adjusted.

3. The man-machine interface according to claim 1, wherein the means for displaying setting parameters is for highlighting at least one item of information displayed on the screen representative of a parameter whose setting is being adjusted.

4. The man-machine interface according to claim 1, wherein the means for displaying setting parameters is for changing at least a color of text or background of at least one item of information displayed on the screen representative of a parameter whose value is being modified.

5. The man-machine interface according to claim 1, wherein the man-machine interface further comprises display means for displaying a scrollable menu for framing at least one item of information to be selected in a selection phase.

6. The man-machine interface according to claim 5, wherein the display means is for highlighting in a scrollable menu one item of information in a top-most position, one item of information in a bottom-most position, and items of information in respective intermediate position between a top-most positions and a bottom-most position.

7. The man-machine interface according to claim 1, wherein the man-machine interface further comprises selection means comprising function buttons associated with indicator lights to indicate a function selected by a button.

8. The man-machine interface according to claim 7, wherein the function buttons comprise at least a first button for selecting a measurement function, at least a second button for selecting a maintenance function, and a third button for selecting a setting function.

9. A process for setting parameters of a trip device comprising:

activating a setting function selection button, displaying a list of protection curves, activating at least one shift button in a scrollable menu, activating a validate button to select a curve whose parameters are to be set, displaying a selected curve and corresponding setting parameters, displaying a portion of the selected curve and a corresponding parameter with a frame, activating at least one shift button to change the portion of a curve and a corresponding parameter, activating a validate button to switch to a parameter value modification mode, activating a shift button to change parameter values, and activating at least one validate button to quit a modification mode.

10. The man-machine interface according to claim 1, wherein the interface is connected by communication means to the processing unit.

11. The man-machine interface according to claim 10, wherein the communication means is for communicating according to an Internet type protocol.

12. The man-machine interface according to claim 1, wherein the interface is represented on a screen for displaying information and tripping curves and for determining setting parameters.

13. The man-machine interface according to claim 2, wherein setting parameters are determined the soft key represented on a screen of the interface.

14. A man-machine interface according to claim 1, in combination with, a circuit breaker comprising main contacts connected in series with power conductors, current sensors located on said conductors, and a tripping relay for receiving a tripping signal to bring about opening of said contacts, wherein the man-machine interface is connected to said current sensors and to said tripping relay.

* * * * *